US010221288B1

(12) United States Patent
Czaplewski et al.

(10) Patent No.: US 10,221,288 B1
(45) Date of Patent: Mar. 5, 2019

(54) MATRIX BONDING ABRASION RESISTANT CNTS (MBARCS) AND EMPLOYING SAME IN FIBER REINFORCED POLYMER COMPOSITES

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 15/671,411

(22) Filed: Aug. 8, 2017

(51) Int. Cl.
  *C08J 5/06* (2006.01)
  *C01B 32/174* (2017.01)
  *C08J 5/04* (2006.01)

(52) U.S. Cl.
  CPC ............... *C08J 5/06* (2013.01); *C01B 32/174* (2017.08); *C08J 5/042* (2013.01); *C08J 2300/00* (2013.01)

(58) Field of Classification Search
  CPC .......... C08J 5/06; C08J 5/042; C08J 2300/00; C01B 32/174
  USPC ....................................................... 524/267
  See application file for complete search history.

(56) References Cited

U.S. PATENT DOCUMENTS

| 7,645,400 | B2 | 1/2010 | Saitoh |
| 7,777,176 | B2 | 8/2010 | Loy et al. |
| 8,470,423 | B2 | 6/2013 | Jarvenkyla |
| 8,561,514 | B2 | 10/2013 | Head, III et al. |
| 2010/0203351 | A1 | 8/2010 | Nayfeh |
| 2014/0030527 | A1 | 1/2014 | Loget et al. |

FOREIGN PATENT DOCUMENTS

| CN | 105175781 A | 12/2015 |
| KR | 10-0663884 B1 | 1/2007 |

OTHER PUBLICATIONS

Velasco-Santos et al., downloaded from <https://cdn.intechopen.com/pdfs-wm/16999.pdf>, 2011. (Year: 2011).*
Disclosed Anonymously, "Spun CNT Nanofiber Cable," An IP.com Prior Art Database Technical Disclosure, IPCOM000214387D, Jan. 24, 2012, 18 pages.
Abbasi et al., "Effect of aspect ratio, surface modification and compatibilizer on the mechanical and thermal properties of ldpe-mwcnt nanocomposites," e-Polymers, 2011, No. 067, 17 pages.
Takakura, T., "Stiffness and Abrasion-Resistance Improvement of Fiber-Reinforced Plastics," NineSights, NineSigma, Request No. REQ8320996, 3 pages, printed from <https://ninesights.ninesigma.com/projects/-/rfp-portlet/rfpViewer/3209> on Mar. 14, 2017.
Unknown, "Benefits of Long Fiber Reinforced Thermoplastic Composites," PlastiComp, Inc., 6 pages, printed from <http://www.plasticomp.com/long-fiber-benefits/> on Mar. 14, 2017.
Unkown, "Design Considerations for Successfully Using Long Fiber Thermoplastic Composites as Substitutes for Metals," White Paper, PlastiComp, Inc., 7 pages, downloaded from <http://www.plasticomp.com/long-fiber-design-principles-white-paper/> on Dec. 27, 2016.
Zhoa et al., "Fabrication of silica-coated carbon fiber ultramicroelectrodes by chemical vapor deposition," Journal of Electronyanalytical Chemistry, vol. 379, 1994, pp. 505-508 (first page only), downloaded from <http://www.sciencedirect.com/sdfe/pdf/download/eid/1-s2.0-0022072894871760/first-page-pdf> on Mar. 14, 2017.
Unknown, "Thermal Spray Coating Photomicrographs Coatings on Glass and Carbon Fibre Reinforced Composites," Gordon England, 3 pages, printed from <http://www.gordonengland.co.uk/pmg7.htm> on Mar. 14, 2017.
Bottini et al., "Covalent decoration of multi-walled carbon nanotubes with silica nanoparticles," Chemical Communications, 2005, pp. 758-760.
Unknown, "Functionalized Carbon Nanotubes," CheapTubes.com, 1 page, printed from <https://www.cheaptubes.com/wp-content/uploads/2015/10/functionalized-carbon-nanotubes.gif> on Mar. 14, 2017.
Stöber et al., "Controlled Growth of Monodisperse Silica Spheres in the Micron Size Range," Journal of Colloid and Interface Science, vol. 26, 1968, pp. 62-69.
Hines et al., "High-yield photolytic generation of brominated single-walled carbon nanotubes and their application for gas sensing," Chemical Communications, vol. 50, 2014, pp. 11568-11571.
Velasco-Santos et al., "Silanization of Carbon Nanotubes: Surface Modification and Polymer Nanocomposites," 2011, 31 pages, downloaded from <https://cdn.intechopen.com/pdfs-wm/16999.pdf> on Mar. 14, 2017.
Chan et al., "Enol Silyl Ethers via Copper(II)-Catalyzed C—O Bond Formation," Organic Letters, vol. 13, No. 10, 2011, pp. 2778-2781.

(Continued)

*Primary Examiner* — Hui H Chin
(74) *Attorney, Agent, or Firm* — Matthew J. Bussan (57) ABSTRACT

A process of providing matrix-bonding abrasion resistant CNTs (MBARCs) includes reacting functionalized carbon nanotubes (f-CNTs) and Janus particles, wherein each of the Janus particles is a silica particle having a surface with a first portion containing a CNT-bonding functionality and a second portion containing a matrix-bonding functionality. The CNT-bonding functionality may include, for example, one or more hydroxyl groups. The matrix-bonding functionality may be, for example, selected from a group consisting of vinyl functionalities, amine functionalities, epoxy functionalities, allyl functionalities, acrylate functionalities, sulfur functionalities, isocyanate functionalities, halogen functionalities, and combinations thereof. In some embodiments, the MBARCs are processed to produce fibers that, in turn, may be blended into a polymeric resin to produce a fiber reinforced polymer composite.

17 Claims, 9 Drawing Sheets

(56) References Cited

OTHER PUBLICATIONS

Unkown, "Janus particles," Wikipedia, 11 pages, printed from <https://en.wikipedia.org/wiki/Janus_particles?oldid=752506571> on Mar. 15, 2017.

Shin et al., "Surface properties of silica nanoparticles modified with polymers for polymer nanocomposite applications," Journal of Industrial and Engineering Chemistry, vol. 14, 2008, pp. 515-519.

Unkown, "Silane Coupling Agents," Mitsubishi International PolymerTrade Corporation, 6 pages, printed from <http://www.micchem.com/silane_coupling_agents.html> on Jul. 28, 2017.

Shawon, Zayed Bin Zakidr, "Synthesis and Characterization of Janus Magnetic Nanoparticles and its Application as an Adsorbent," Journal of Chemical Engineering, IEB vol. ChE. 27, No. 1, Jun. 2012, pp. 64-68.

Wu et al., "Chemistry of carbon nanotubes in biomedical applications," Journal of Materials Chemistry, vol. 20, 2010, pp. 1036-1052.

Chronopoulos et al., "High-Yield Alkylation and Arylation of Graphene via Grignard Reaction with Fluorographene," Chemistry of Materials, vol. 29, 2017, pp. 926-930.

Lin et al., "Chemistry of Carbon Nanotubes," Australian Journal of Chemistry, vol. 56, 2003, pp. 635-651.

Unknown, "Gelest Silane Coupling Agents—Gelest, Inc.," Brochure, Gelest, Inc., downloaded from <https://www.gelest.com/wp-content/uploads/Goods-PDF-brochures-couplingagents.pdf> on Jul. 22, 2017.

Rodriguez-Fernandez et al., "Colloidal Synthesis of Gold Semishells," ChemistryOpen, vol. 1, 2012, pp. 90-95.

Unkown, "Lipid and Janus Nanoparticles for Active Delivery," 2014, downloaded from <https://riuma.uma.es/xmlui/bitstream/handle/10630/7666/Presentacion%20UPMC.pdf?sequence=3> on Jul. 19, 2017.

\* cited by examiner

MATRIX BONDING ABRASION RESISTANT CNTS (MBARCS) AND EMPLOYING SAME IN FIBER REINFORCED POLYMER COMPOSITES

BACKGROUND

The present invention relates in general to the field of materials science. More particularly, the present invention relates to matrix-bonding abrasion resistant CNTs (MBARCs) that may be processed to produce fibers that, in turn, may be blended with a polymeric resin to produce a fiber reinforce polymer composite.

SUMMARY

In accordance with an embodiment, a process of providing matrix-bonding abrasion resistant CNTs (MBARCs) includes reacting functionalized carbon nanotubes (f-CNTs) and Janus particles, wherein each of the Janus particles is a silica particle having a surface with a first portion containing a CNT-bonding functionality and a second portion containing a matrix-bonding functionality. The CNT-bonding functionality may include, for example, one or more hydroxyl groups. The matrix-bonding functionality may be, for example, selected from a group consisting of vinyl functionalities, amine functionalities, epoxy functionalities, allyl functionalities, acrylate functionalities, sulfur functionalities, isocyanate functionalities, halogen functionalities, and combinations thereof. In some embodiments, the MBARCs are processed to produce fibers that, in turn, may be blended into a polymeric resin to produce a fiber reinforced polymer composite.

BRIEF DESCRIPTION OF THE SEVERAL VIEWS OF THE DRAWINGS

Embodiments of the present invention will hereinafter be described in conjunction with the appended drawings, where like designations denote like elements. Elements are not necessarily scaled with respect to each other.

DETAILED DESCRIPTION

The present disclosure describes matrix-bonding abrasion resistant CNTs (MBARCs) provided by a process that includes reacting functionalized carbon nanotubes (f-CNTs) and Janus particles, wherein each of the Janus particles is a silica particle having a surface with a first portion containing a CNT-bonding functionality and a second portion containing a matrix-bonding functionality. The CNT-bonding functionality may include, for example, one or more hydroxyl groups. The matrix-bonding functionality may be, for example, selected from a group consisting of vinyl functionalities, amine functionalities, epoxy functionalities, allyl functionalities, acrylate functionalities, sulfur functionalities, isocyanate functionalities, halogen functionalities, and combinations thereof. In some embodiments, the MBARCs are processed to produce fibers that, in turn, may be blended into a polymeric resin to produce a fiber reinforced polymer composite.

In some embodiments, silica Janus particles are reacted with functionalized carbon nanotubes (f-CNTs). The use of silica Janus particles in accordance with some embodiments of the present invention is advantageous because it simultaneously allows silica particles to be bound to CNTs (via the CNT-bonding functionality of the silica Janus particles) to impart abrasion resistance, while also allowing for binding into a resin (via the matrix-bonding functionality of the silica Janus particles) to improve modulus and stiffness.

In an example application, MBARCs of the present disclosure may be processed to produce fibers that may be blended into a polymeric resin to produce a fiber reinforced polymer composite that satisfies particular performance characteristics. For example, MBARCs of the present disclosure may be used to produce a fiber reinforced polymer composite that can withstand contact against polyethylene terephthalate (PET) under high pressure and velocity (e.g., 6 MPa and 50 m/min, respectively). Fiber reinforced polymer composites produced using MBARC-containing fibers of the present disclosure may, for example, exhibit a stiffness (flexural modulus) of 30 GPa and an abrasion resistance substantially equivalent to that of zinc. Fiber reinforced polymer composites produced by blending MBARC-containing fibers of the present disclosure into a polymeric resin may be, for example, injection molded with a production cycle time of roughly 20 seconds.

In numerous applications, manufacturers seek to substitute engineered plastic components for metal components. Typically, this substitution reduces the weight and increases the productivity of the component. Various manufacturers are attempting to develop high-performance plastic materials, with a particular focus on glass fiber reinforced polyamide composite materials, to achieve the required stiffness and abrasion resistance performance for successful replacement of metal components.

Several techniques may be used to increase the modulus of polyamide resins. Most notable among these is the use of long glass (or high aspect ratio) fiber. The benefits of long fiber or high aspect ratio fiber (e.g., length:diameter=800:1) are well known to those skilled in the art. Unfortunately, simply loading polyamide resin with the maximum workable level of long glass fibers does not achieve the desired properties. Consequently, an alternative approach is required. Other approaches to increase the modulus of polyamide resins include the use of braided CNTs, coating carbon fiber with a non-conductive silica, and thermal spraying of ceramic coatings on glass or carbon fiber. None of these approaches, however, achieves the desired properties.

In accordance with some embodiments of the present disclosure, high aspect ratio CNTs with a "hard coat" of silica functionality are utilized. This silica functionality may be provided by employing Janus particles, for example, that not only have a CNT-bonding functionality for bonding to the high aspect ratio CNT but, additionally, have a matrix-bonding functionality for bonding to a polymer matrix.

Figure 1:
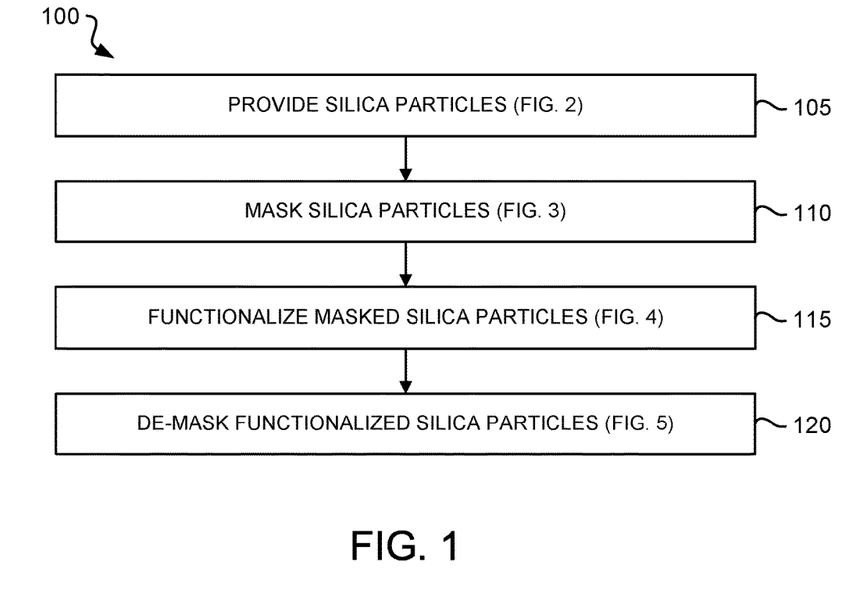
FIG. 1 is a flow diagram illustrating a process of producing Janus particles, according to some embodiments.

Prophetic Preparation of Silica Janus Particles with CNT-Bonding Functionality and Matrix-Bonding Functionality FIG. 1 is a flow diagram illustrating a process 100 of producing Janus particles with a CNT-bonding functionality and a matrix-bonding functionality, according to some embodiments. In the process 100, the steps discussed below (steps 105-120) are performed. These steps are set forth in their preferred order. It must be understood, however, that the various steps may occur simultaneously or at other times relative to one another. Moreover, those skilled in the art will appreciate that one or more steps may be omitted.

A Janus particle is a microscopic particle, typically a nanoparticle, having at least two distinct faces with different chemical and/or physical properties. For example, a Janus particle may be a spherical nanoparticle having a hydrophilic hemisphere and a hydrophobic hemisphere. Janus particles are named after the two-faced Roman god Janus. The synthesis of Janus nanoparticles requires the ability to selectively generate each face of a nanometer-sized particle with different chemical and/or physical properties. Janus nanoparticles may be synthesized using any of several competing methods including, but not limited to, masking, self-assembly, and phase separation. Thus, while masking is used in the process 100, one skilled in the art will appreciated that other methods of producing Janus particles may be used in lieu of, or in addition to, masking.

As noted above, masking is used in the process 100. Masking involves the protection of one side of a nanoparticle (e.g., molten paraffin wax is mixed into a solution containing silica nanoparticles and the solution subsequently cooled to solidify the wax, thereby trapping one half of each silica nanoparticle in the wax surface and leaving the other half of each silica nanoparticle exposed outside the wax surface), followed by the modification of the unprotected side of the nanoparticle, and subsequent removal of the protection. The mask is typically made of paraffin wax. However, other suitable masking materials may be used in lieu of paraffin wax. Other suitable masking materials include, but are not limited to, polydimethylsiloxane (PDMS) polymer film.

Figure 2:
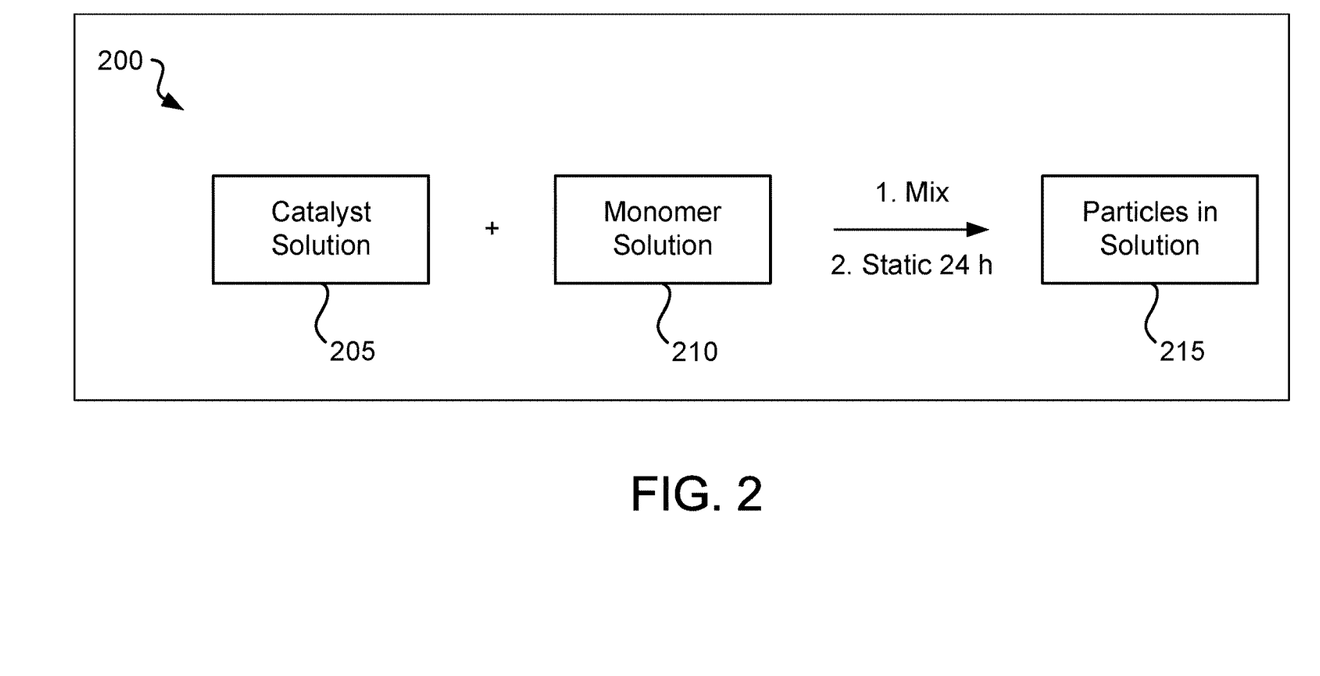
FIG. 2 is a block diagram showing a particular embodiment of a synthetic procedure for producing silica particles that may be utilized in the process of FIG. 1.

The process 100 begins by providing silica particles (step 105). For example, silica particles may be synthesized by the Stöber process using, for example, tetraethyl orthosilicate (TEOS). The Stöber process is described in Stöber et al., "Controlled Growth of Monodisperse Silica Spheres in the Micron Size Range," Journal of Colloid and Interface Science, Vol. 26, 1968, pages 62-69, which is hereby incorporated herein by reference in its entirety. One skilled in the art will appreciate, however, that the silica particles may be synthesized by other processes or obtained commercially. A particular embodiment of a synthetic procedure for producing silica nanoparticles using a modified Stöber process is shown in FIG. 2.

Figure 3:
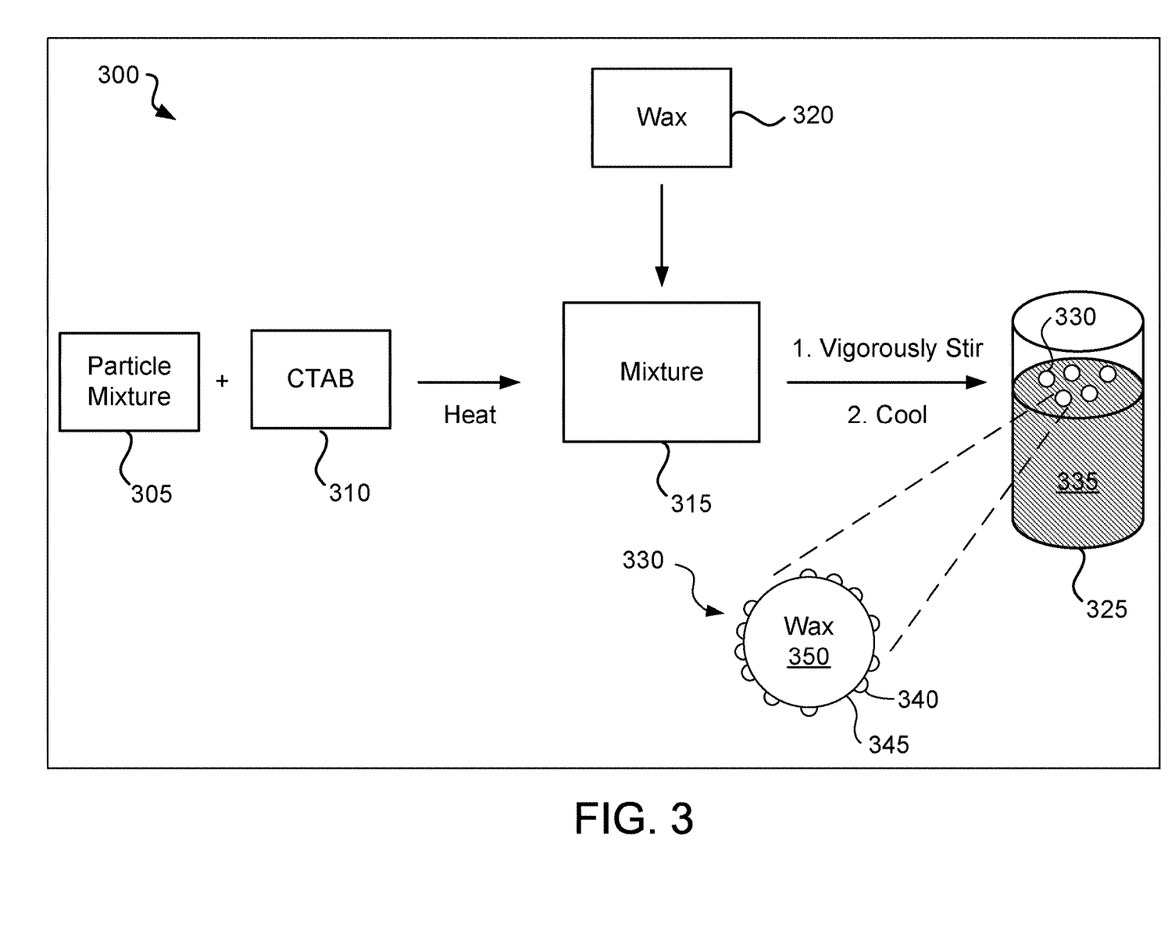
FIG. 3 is a block diagram showing a particular embodiment of a synthetic procedure for masking silica particles that may be utilized in the process of FIG. 1.

The process 100 continues by masking the silica particles (step 110). For example, silica nanoparticles may be masked using paraffin wax. A particular embodiment of a synthetic procedure for masking silica particles using paraffin wax is shown in FIG. 3.

Figure 4:
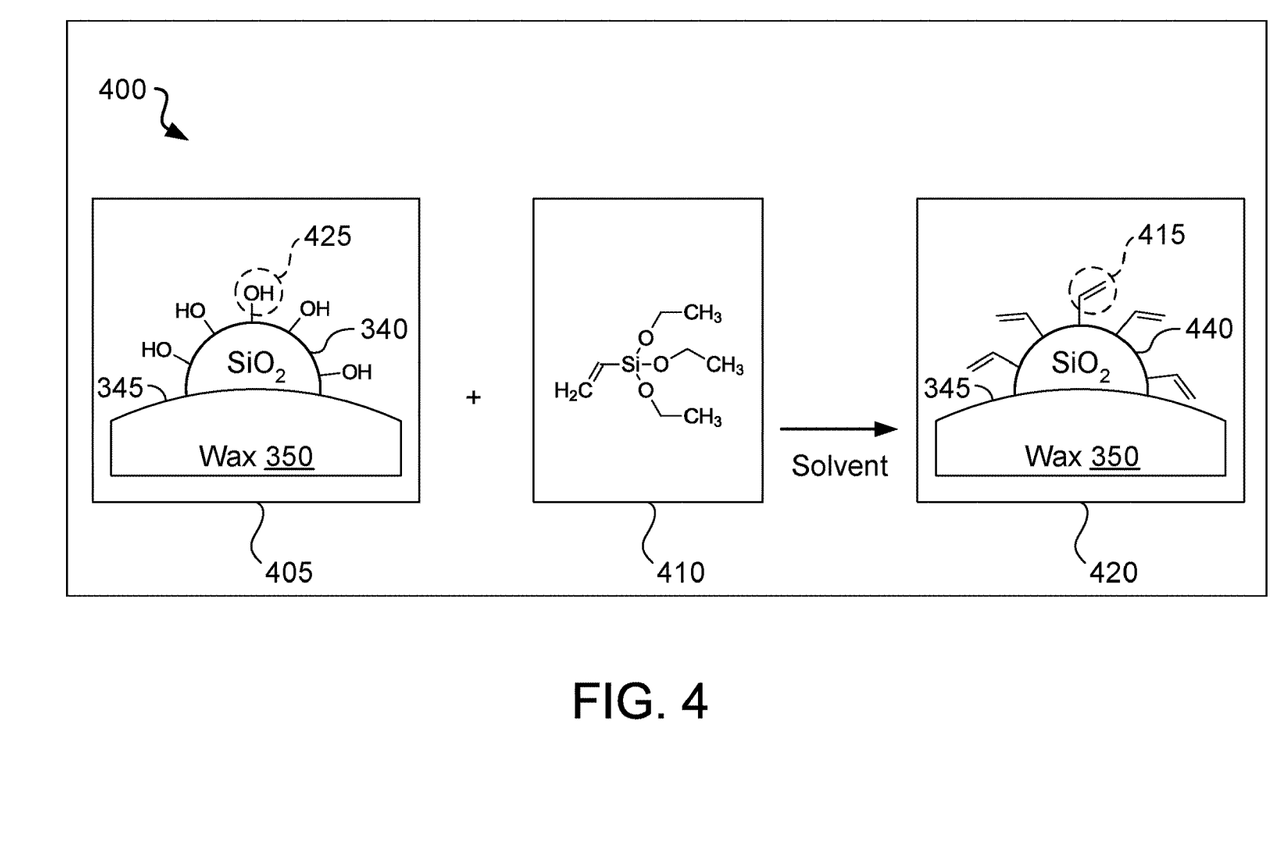
FIG. 4 is a block diagram showing a particular embodiment of a synthetic procedure for functionalizing masked silica particles that may be utilized in the process of FIG. 1.

The process 100 continues by functionalizing the masked silica particles (step 115). For example, masked silica nanoparticles may be functionalized using a silane coupling agent to introduce reactive groups on the unprotected side of the masked silica particles. In accordance with some embodiments, the reactive groups introduced by the silane coupling agent include one or more matrix-bonding functionalities that is/are capable of reacting with a polymeric resin into which matrix-bonding abrasion resistant CNTs (MBARCs) or MBARCs-containing fibers are to be blended. The matrix-bonding functionality allows the MBARCs or MARCs-containing fibers to be covalently bonded into a particular polymer matrix. That is, the MBARCs or MARCs-containing fibers may be "tailored" for blending and bonding into a given polymer matrix. The matrix-bonding functionalities may be, for example, selected from a group consisting of vinyl functionalities, amine functionalities, epoxy functionalities, allyl functionalities, acrylate functionalities, sulfur functionalities, isocyanate functionalities, halogen functionalities, and combinations thereof. A particular embodiment of a synthetic procedure for functionalizing masked silica nanoparticles using triethoxyvinylsilane as a silane coupling agent to introduce vinyl groups as reactive groups on the unprotected side of the masked silica nanoparticles is shown in FIG. 4.

Generally, silane coupling agents are organosilane compounds having a silicon atom that is bonded to reactive groups of two different types (i.e., one or more reactive groups of a first type and one or more reactive groups of a second type). Reactive groups of the first type (e.g., alkoxy groups) are reactive with various inorganic materials (e.g., silica) to form a chemical bond with the surface of the inorganic material. In some embodiments, these reactive groups of the first type may be, for example, alkoxy groups that react with hydroxyl groups on the surface of a silica nanoparticle (or silica microparticle) to form a chemical bond with the surface of the silica nanoparticle (or silica microparticle). Reactive groups of the second type (e.g., vinyl, amine, epoxy, allyl, acrylate, sulfur, isocyanate, and halogen groups) are reactive with various kinds of organic materials (e.g., polymeric resins) to form a chemical bond with the organic material. In some embodiments, these reactive groups of the second type may be, for example, amine, epoxy, and/or isocyanate groups that are capable of reacting with various polyamide resins (or other polymeric resins into which MARCs or MARCs-containing fibers are to be blended) to form a chemical bond with a polymer matrix produced from the polymeric resin.

One skilled in the art will appreciate that selection of the silane coupling agent used to introduce the matrix-bonding functionality on the unprotected side of the masked silica particles may be based upon the particular polymeric resin into which matrix-bonding abrasion resistant CNTs (MBARCs) or MARCs-containing fibers are to be blended. For example, an epoxy functionality may be selected as the matrix-bonding functionality to provide MBARCs tailored for blending and bonding into polymer matrices produced from acrylic-based resins, butyl-based resins, cellulosic-based resins, epoxy-based resins, furan-based resins, melamine-based resins, nitrile-based resins, phenolic-based resins, polyamide-based resins, polyester-based resins, polyolefin-based resins, polysulfide-based resins, polyurethane-based resins, silicone-based resins, styrene-butadiene-based resins, urea-formaldehyde-based resins, and vinyl (PVC)- based resins. An epoxy functionality may be introduced on the unprotected side of the masked silica particle using an epoxysilane, such as Trimethoxy[2-(7-oxabicyclo[4.1.0]hept-3-yl)ethyl]silane (CAS Number 3388-04-3), (3-Glycidyloxypropyl)trimethoxysilane (CAS Number 2530-83-8), Diethoxy(3-glycidyloxypropyl)methylsilane (CAS Number 2897-60-1), and the like.

As another example, a vinyl functionality (or allyl functionality) may be selected as the matrix-bonding functionality to provide MBARCs tailored for blending and bonding into polymer matrices produced from polyamide-based resins, polyester-based resins, polyolefin-based resins, polysulfide-based resins, silicone-based resins, styrene-butadiene-based resins, and vinyl (PVC)-based resins. A vinyl functionality may be introduced on the unprotected side of the masked silica particle using a vinylsilane, such as Trichlorovinylsilane (CAS Number 75-94-5), Tris(2-methoxyethoxy)(vinyl)silane (CAS Number 1067-53-4), Triethoxyvinylsilane (CAS Number 78-08-0), Vinyltrimethoxysilane (CAS Number 2768-02-7), and the like. An allyl functionality may be introduced on the unprotected side of the masked silica particle using an allylsilane, such as 11-Allyloxyundecyltrimethoxysil ane (CAS Number 1196453-35-6), Allyltriethoxysilane (CAS Number 2550-04-1), Allyltrimethoxysilane (CAS Number 2551-83-9), 2-(chloromethyl)allyltrimethoxysilane (CAS Number 39197-94-9), N-Allyl-aza-2,2-dimethoxysilacyclopentate (CAS Number 618914-49-1), Allylmethyldimethoxysilane (CAS Number 67681-66-7), and the like.

As yet another example, an acrylate functionality may be selected as the matrix-bonding functionality to provide MBARCs tailored for blending and bonding into polymer matrices produced from acrylic-based resins, butyl-based resins, polyester-based resins, polyether-based resins, polyolefin-based resins, polyurethane-based resins, silicone-based resins, and vinyl (PVC)-based resins. An acrylate functionality may be introduced on the unprotected side of the masked silica particle using an acryloyloxysilane, such as 3-(Trimethoxysilyl)propyl acrylate (CAS Number 4369-14-6), 3-(Trimethoxysilyl)propyl methacrylate (CAS Number 2530-85-0), and the like.

As still another example, an amine functionality may be selected as the matrix-bonding functionality to provide MBARCs tailored for blending and bonding into polymer matrices produced from acrylic-based resins, butyl-based resins, cellulosic-based resins, epoxy-based resins, furan-based resins, melamine-based resins, neoprene-based resins, nitrile-based resins, nitrocellulose-based resins, phenolic-based resins, polyamide-based resins, polyester-based resins, polyether-based resins, polyolefin-based resins, polysulfide-based resins, polyurethane-based resins, polyvinyl butyral-based resins, silicone-based resins, urea-formaldehyde-based resins, and vinyl (PVC)-based resins. An amine functionality may be introduced on the unprotected side of the masked silica particle using an aminosilane, such as N-[3-(Trimethoxysilyl)propyl]ethylenediamine (CAS Number 1760-24-3), 3-(2-Aminoethylamino)propyldimethoxymethylsilane (CAS Number 3069-29-2), (3-Aminopropyl)triethoxysilane (CAS Number 919-30-2), (3-Aminopropyl)trimethoxysilane (CAS Number 13822-56-5), N-[3-(Trimethoxysilyl)propyl]aniline (CAS Number 3068-76-6), and the like.

Still other functionalities may be selected as the matrix-bonding functionality to provide MBARCs tailored for blending and bonding into various polymer matrices. For example, a sulfur functionality may be introduced on the unprotected side of the masked silica particle using a mercaptosilane, such as (3-Mercaptopropyl)trimethoxysilane (CAS Number 4420-74-0), (3-Mercaptopropyl)methyldimethoxysilane (CAS Number 31001-77-1), and the like, for acryic-based resins, butyl-based resins, epoxy-based resins, neoprene-based resins, nitrile-based resins, phenolic-based resins, polyolefin-based resins, polysulfide-based resins, polyurethane-based resins, and styrene-butadiene-based resins. An isocyanate functionality may be introduced on the unprotected side of the masked silica particle using an isocyanatesilane, such as 3-(Triethoxysilyl)propyl isocyanate (CAS Number 24801-88-5) and the like, for acrylic-based resins, cellulosic-based resins, melamine-based resins, polyamide-based resins, polyurethane-based resins, silicone-based resins, and urea-formaldehyde-based resins. A halogen functionality may be introduced on the unprotected side of the masked silica particle using a halogen functional silane, such as (3-Chloropropyl)trimethoxysilane (CAS Number 2530-87-2) and the like, for epoxy-based resins.

Figure 5:
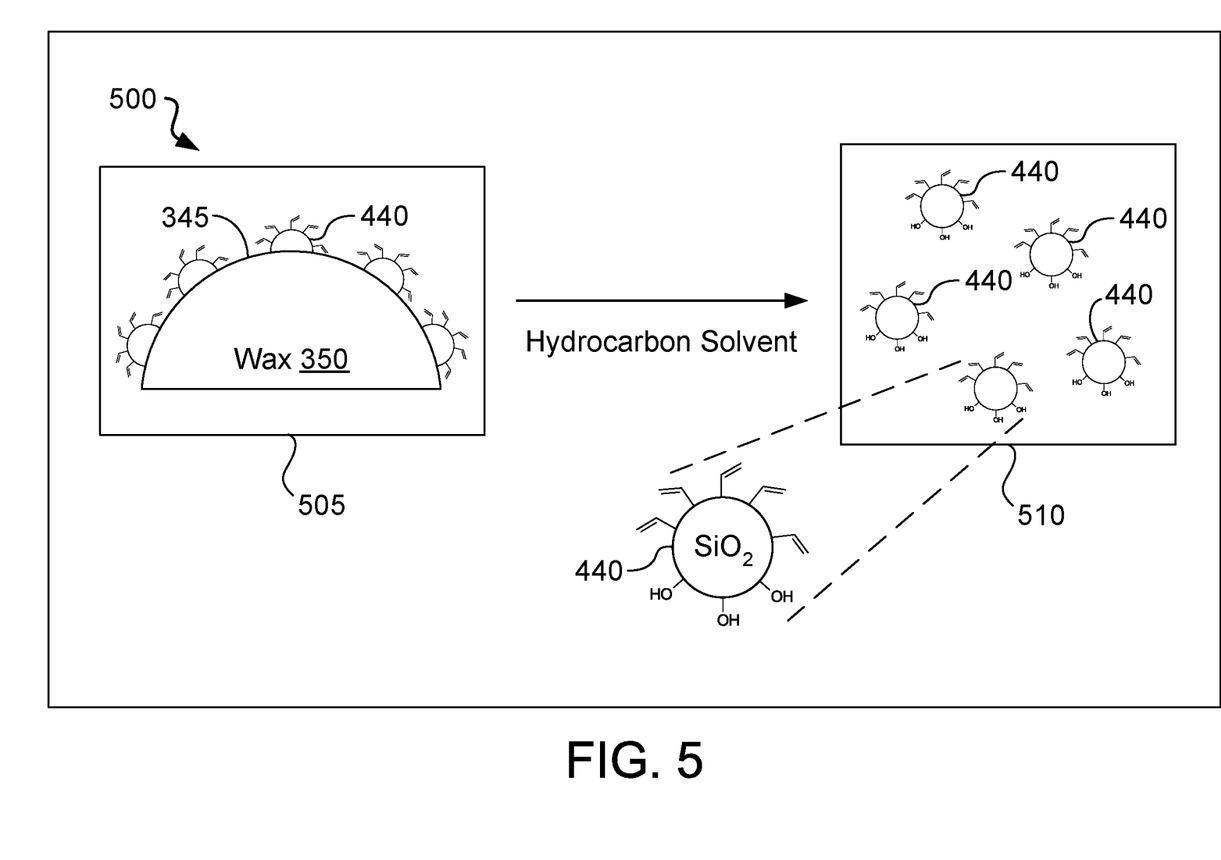
FIG. 5 is a block diagram showing a particular embodiment of a synthetic procedure for de-masking functionalized silica particles that may be utilized in the process of FIG. 1.

The process 100 ends by de-masking the functionalized silica particles (step 120). For example, functionalized silica nanoparticles may be de-masked using a solvent to dissolve away the mask. A particular embodiment of a synthetic procedure for de-masking the functionalized silica nanoparticles using a hydrocarbon solvent, such as benzene, to dissolve away the paraffin wax is shown in FIG. 5.

FIG. 2 is a block diagram showing a particular embodiment of a synthetic procedure 200 for producing silica particles that may be utilized in the process 100 of FIG. 1. The synthetic procedure 200 shown in FIG. 2 may correspond to step 105 in the process 100 of FIG. 1. Silica particles may be produced through the polymerization of a suitable silica precursor, such as tetralkoxysilane (e.g., $Si(OR')_4$, where R' is a methyl or ethyl group). In accordance with some embodiments, synthetic procedure 200 is performed via a polymerization reaction of a tetralkoxysilane using a modified Stöber process. The Stöber process, itself, and modifications thereof are well known in the art. A modified Stöber process is, for example, disclosed in U.S. Pat. No. 7,777,176 B2, issued to Loy et al. on Aug. 17, 2010, entitled "COMPOSITION AND METHOD TO CHARACTERIZE MEMBRANES' DEFECTS", which is hereby incorporated herein by reference in its entirety.

The modified Stöber synthesis of monodisperse silica particles illustrated in FIG. 2 is exemplary and non-limiting. One skilled in the art will appreciate that the silica particles may be synthesized by other processes or obtained commercially. The silica precursor utilized in synthetic procedure 200 may be, for example, a tetralkoxysilane. Utilizing a silica precursor (e.g., TEOS in the prophetic example, described below), ammonia, water and a solvent gives the ability to afford monodispersed particles that have diameters in the nanometer size range up to the micron size range. In accordance with some embodiments, the silica particle is a nanoparticle approximately 15 to 1000 nm in diameter. Particle size can be controlled using chemical concentration. For example, in the modified Stöber process, the concentration of water can be used to vary particle size.

After synthesis, the silica particles are removed from their mother liquor solution to halt the growth of the particles and obtain the desired particle size. Through the process of centrifugation and solvent washes, particles are removed from any residual catalyst and precursor monomer. Particles are then removed from solution in vacuo for ease of processing further tasks.

Prophetic Example of Silica Nanoparticle Synthesis

A prophetic example of the synthetic procedure 200 depicted in FIG. 2 is described below. In this prophetic example, silica particles are prepared through a modified Stöber process using ammonia, deionized water, tetraethoxysilane (TEOS), and ethanol. TEOS is commercially available from chemical suppliers, such as Sigma-Aldrich, St. Louis, Mo. One skilled in the art will appreciate that other silica precursors may be used in lieu of, or in addition to, TEOS.

To a glass vial, 2M ammonia (3.75 mL) and water (0.63 mL) are added to generate a catalyst (ammoniacal) solution 205. To a second glass vial, TEOS (0.38 mL, $1.70 \times 10^{-3}$ mol) and 200 proof ethanol (5.24 mL) are then added to generate a monomer solution 210. In this prophetic example, TEOS is used as the suitable tetralkoxysilane (e.g., $Si(OR')_4$, where R' is a methyl or ethyl group). Next, the catalyst (ammoniacal) solution 205 is added to the monomer solution 210 and stirred vigorously for 24 hours to generate silica particles in solution 215. The silica particles are then centrifuged, washed, and dried to remove any unreacted silane. *End of the prophetic example of silica nanoparticle synthesis.*

FIG. 3 is a block diagram showing a particular embodiment of a synthetic procedure 300 for masking silica particles that may be utilized in the process of FIG. 1. The synthetic procedure 300 shown in FIG. 3 may correspond to step 110 in the process 100 of FIG. 1. In preparation of "two-faced" particles in accordance with some embodiments, a Pickering emulsion is fabricated in synthetic procedure 300. This emulsion facilitates a liquid-liquid/liquid-solid hybrid interface method that is used in the synthetic procedure 300 to mask silica particles. The emulsion contains silica particles, a water/ethanol solution, cetyl trimethylammonium bromide (CTAB), and molten paraffin wax. The silica particles are adsorbed onto the liquid-liquid interface of the emulsion formed by the molten paraffin wax and the water/ethanol solution. Cooling the emulsion traps the silica particles at the liquid-solid interface between the water/ethanol solution and the solidified wax.

The synthetic procedure 300 for masking silica particles illustrated in FIG. 3 is exemplary and non-limiting. One skilled in the art will appreciate, for example, that the silica particles may be masked using other synthetic procedures and/or other masking materials, such as polydimethylsiloxane (PDMS) polymer film.

Prophetic Example of Silica Nanoparticle Masking

A prophetic example of the synthetic procedure 300 depicted in FIG. 3 is described below. In this prophetic example, silica particles are masked through a liquid-liquid/liquid-solid hybrid interface method using an emulsion that contains silica particles, a water/ethanol solution, cetyl trimethylammonium bromide (CTAB), and molten paraffin wax. CTAB is a cationic surfactant that is commercially available from chemical suppliers, such as Sigma-Aldrich, St. Louis, Mo. Paraffin wax is commercially available from chemical suppliers, such as Sigma-Aldrich, St. Louis, Mo.

Silica particles (0.27 g) (e.g., prepared via synthetic procedure 200) are dispersed in an ethanol/water solution (7.0% w/w, 130 mL) at an elevated temperature (76-84° C.) (to melt the wax that will be added later) and then mixed. The particle mixture 305 is then mixed with cetyl trimethylammonium bromide (CTAB) (0.027 g) 310, to partially hydrophobize the surface of the silica particles. A low concentration of CTAB is used to avoid the creation of a bilayer at the surface of the particle. The CTAB also allows for the particle to favor adsorption at the oil-water interface (i.e., the interface between the molten paraffin wax and the ethanol/water solution). One skilled in the art will appreciate that other suitable surfactants may be used in lieu of, or in addition to, CTAB. Other suitable surfactants include, but are not limited to, dodecyltrimethylammonium bromide (DTAB) and didodecyldimethylammonium bromide (DDAB). Paraffin wax 320 (8.9 g) (mp=58 to 62° C.) is then deposited on top of the particle suspension and the mixture 315 is vigorously stirred (1800 rpm for 45 min) at the elevated temperature (76-84° C.) to form an emulsion 325. After cooling to room temperature, the paraffin wax solidifies into solid droplets 330 with the silica particles 340 partially protruding from the surface 345 of the solidified paraffin wax 350. The solidified wax droplets 330 are also referred to as "colloidosomes." The silica particles 340 are trapped at the liquid-solid interface between the water/ethanol solution 335 and the solidified paraffin wax 350. The colloidosomes 330 are then washed with an acid to remove CTAB and expose an unprotected (bare) side of each of the silica particles 340. A protected (i.e., embedded in the solidified paraffin wax 350) side of each of the silica particles 340 is masked by the solidified paraffin wax 350. *End of the prophetic example of silica nanoparticle masking.*

FIG. 4 is a block diagram showing a particular embodiment of a synthetic procedure 400 for functionalizing masked silica particles that may be utilized in the process of FIG. 1. The synthetic procedure 400 shown in FIG. 4 may correspond to step 115 in the process 100 of FIG. 1. In order to attach silica particles to the resin, the particles must first be partially functionalized. The matrix-bonding functionalization of a silica Janus particle illustrated in FIG. 4 is exemplary and non-limiting. One skilled in the art will appreciate that the silica Janus particle may be partially functionalized using other processes.

In synthetic procedure 400, masked silica nanoparticles are functionalized using a silane coupling agent to introduce reactive groups on the unprotected side of the masked silica particles. As illustrated in FIG. 4, a masked silica nanoparticle 405 (e.g., one of the silica particles 340 partially extruding from the surface 345 of the solidified paraffin wax 350 of one of the colloidosomes 330 prepared via synthetic procedure 300) is functionalized using triethoxyvinylsilane 410 as the silane coupling agent to introduce vinyl groups 415 as reactive groups on the unprotected side of the masked silica nanoparticle 405 to produce a partially-functionalized, masked silica nanoparticle 420 (i.e., a partially-functionalized silica nanoparticle 440 partially extruding from the surface 345 of the solidified paraffin wax 350). The partially-functionalized silica nanoparticle 440 is also referred to herein as a "silica Janus particle." Only five vinyl groups 415 are shown in FIG. 4 on the partially-functionalized silica nanoparticle 440 as not to unnecessarily complicate the drawing. However, one skilled in the art will appreciate that many more vinyl groups 415 are typically introduced on the unprotected side of the masked silica nanoparticle 405 by the silane coupling agent. The vinyl groups 415 are introduced only on the exposed surface (i.e., unprotected side) of the masked silica particle 405. This functionalizes the particle's exposed surface yielding particles having resin bonding characteristics. Other functionalities (for bonding to resins) outside the described vinyl include, but are not limited to, amines, epoxies, allyls, acrylates, mercapto (or other sulfur-containing groups), isocyanates, and halogens.

The alkoxy groups bonded to the silicon atom of the triethoxysilane 410 hydrolyze to silanols, either through the addition of water (e.g., a solvent) or from residual water on the surface of the particle's exposed surface. Subsequently, the silanols react with hydroxyl groups 425 on the particle's exposed surface via a condensation reaction to form a siloxane bond (Si—O—Si) and eliminate water. Only five hydroxyl groups 425 on the silica particle 340 are shown in FIG. 4 as not to unnecessarily complicate the drawing. However, one skilled in the art will appreciate that many more hydroxyl groups 425 are typically present on the particle's surface, both on the exposed surface (i.e., unprotected side) and on the unexposed surface (i.e., masked side). Hydroxyl groups on the particle's unexposed surface are not shown in FIG. 4 as not to unnecessarily complicate the drawing.

Prophetic Example of Masked Silica Nanoparticle Functionalization

A prophetic example of the synthetic procedure 400 depicted in FIG. 4 is described below. In this prophetic example, masked silica particles are functionalized using a water/ethanol solution and triethoxyvinylsilane. Triethoxyvinylsilane is a silane coupling agent that is commercially available from chemical suppliers, such as Sigma-Aldrich, St. Louis, Mo.

Masked silica particles (0.27 g) (e.g., colloidosomes prepared via synthetic procedure 300) are dispersed in an ethanol/water solution (7.0% w/w, 130 mL). Triethoxyvinylsilane (2.8 mL) is then added into the prepared solution. The surface modification reaction is allowed to continue for 24 h with stirring. Alternatively, the triethoxyvinylsilane may be added to the masked silica particles (colloidosomes) in their original emulsion. Once the surface modification reaction is complete, the masked silica particles (colloidosomes) are separated by centrifugation and washed with ethanol. One skilled in the art will appreciate the masked silica particles (colloidosomes) may be functionalized using a gas-phase method in lieu of, or in addition to, the described solution-based method. *End of the prophetic example of masked silica nanoparticle functionalization.*

FIG. 5 is a block diagram showing a particular embodiment of a synthetic procedure 500 for de-masking functionalized silica particles that may be utilized in the process of FIG. 1. The synthetic procedure 500 shown in FIG. 5 may correspond to step 120 in the process 100 of FIG. 1. After the silane functionalization synthesis step (e.g., synthetic procedure 400), the particles must be removed from their wax confines to yield Janus-type particles. To remove the wax, a hydrocarbon solvent (e.g., benzene, kerosene, xylene or other petroleum derivative) is used, which will dissolve away the paraffin wax.

Prophetic Example of Wax Removal to Yield Partially-Modified Particles

The partially-functionalized, masked silica particles 505 (e.g., colloidosomes comprising solidified paraffin wax 350 having a surface 345 on which partially-functionalized silica nanoparticles 440 are embedded that were partially functionalized via synthetic procedure 400) are dissolved in excess benzene or other hydrocarbon solvent to release the partially-functionalized silica particles 510 (e.g., the partially-functionalized silica particles 440 released from the solidified paraffin wax 350 of the colloidosomes). The benzene or other hydrocarbon solvent removes the paraffin wax by dissolution. The partially-functionalized silica particles 510 then are centrifuged and decanted numerous times to yield Janus particles free of wax. *End of the prophetic example of wax removal to yield partially-modified particles.*

As illustrated in FIG. 5, hydroxyl groups are bonded onto the surface of the unmodified hemisphere of the partially-functionalized silica particles 440; whereas, vinyl groups are bonded onto the surface of the modified hemisphere of the partially-functionalized silica particles 440. In accordance with some embodiments, the vinyl groups on the surface of the modified hemisphere of the partially-functionalized silica particles are intended to function as a matrix-bonding functionality for bonding the silica Janus particles 440 to a polymeric matrix. In accordance with some embodiments, the hydroxyl groups on the surface of the unmodified hemisphere of the partially-functionalized silica particles are intended to function as a CNT-bonding functionality for bonding the silica Janus particles 440 to CNTs. One skilled in the art will appreciate that the unmodified hemisphere of the silica Janus particles 440 may be surface modified via an optional, additional step. The type of surface modification performed in such an optional, additional step is primarily dependent on the route of coupling used for bonding the resulting Janus particles to CNTs.

Starting with a Janus particle that includes a CNT-bonding functionality and a matrix-bonding functionality (e.g., the silica Janus particle 440 synthesized above), several procedures may be used to generate functionalized CNTs to which the Janus particle will be bonded. Numerous routes to functionalize CNTs are described in Wu et al., "Chemistry of carbon nanotubes in biomedical applications," Journal of Materials Chemistry, 2010, Vol. 20, pp. 1036-1052, which is hereby incorporated herein by reference in its entirety.

Typically, the CNT-bonding functionality and the matrix-bonding functionality of the Janus particle are different from each other. One skilled in the art will appreciate, however, that the CNT-bonding functionality and the matrix-bonding functionality of the particle may be the same. Further, the Janus particle may be a fully modified Janus particle of only CNT-bonding functionality such that bonding between CNTs is possible. In this document, reference to a "Janus particle" additionally includes such a fully modified Janus particle.

The CNTs may be processed by the following three methods, wherein the "process CNTs" step includes, but is not limited to, braiding, twisting, and the like.

1) Functionalize CNTs, then process CNTs, and then bind Janus particle; or
2) Functionalize CNTs, then bind Janus particle, and then process CNTs; or
3) Process CNTs, then functionalize processed CNTs, and then bind Janus particle.

Some embodiments of the present disclosure are described below in terms of the second method (i.e., functionalize CNTs, then bind Janus particle, and then process CNTs). In the second method, the "functionalize CNTs" step may be accomplished via the synthetic procedure 600 illustrated in FIG. 6 to produce functionalized CNTs (f-CNTs), then the "bind Janus particle" step may be accomplished via the synthetic procedure 700 illustrated in FIG. 7 using the f-CNTs and Janus particles to produce MBARCs, and finally the "process CNTs" step may be accomplished via the synthetic procedure 800 illustrated in FIG. 8 using the MBARCs to produce a MBARCs-containing product (e.g., a fiber containing MBARCs, a fiber reinforced polymer composite, etc.). More generally, however, the techniques described herein with respect to the second method are also applicable, albeit in a different order, to the first method (i.e., functionalize CNTs, then process CNTs, and then bind Janus particle) and the third method (i.e., process CNTs, then functionalize processed CNTs, and then bind Janus particle).

In the first method (i.e., functionalize CNTs, then process CNTs, and then bind Janus particle), the "functionalize CNTs" step may be accomplished via the synthetic procedure 600 illustrated in FIG. 6 to produce functionalized CNTs (f-CNTs), then the "process CNTs" step may be accomplished via techniques described below with respect to the synthetic procedure 800 illustrated in FIG. 8 (e.g., braiding, twisting, and the like) using the f-CNTs to produce processed f-CNTs (e.g., a fiber containing f-CNTs), and finally the "bind Janus particle" step may be accomplished via techniques described below with respect to the synthetic procedure 700 illustrated in FIG. 7 using the processed f-CNTs to produce a MBARCs-containing product (e.g., a fiber containing MBARCs).

In the third method (i.e., process CNTs, then functionalize processed CNTs, and then bind Janus particle), the "process CNTs" step may be accomplished via techniques described below with respect to the synthetic procedure 800 illustrated in FIG. 8 (e.g., braiding, twisting, and the like) to produce processed CNTs (e.g., a fiber containing CNTs), then the "functionalize processed CNTs" step may be accomplished via the synthetic procedure 600 illustrated in FIG. 6 using the processed CNTs to produce processed f-CNTs (e.g., a fiber containing f-CNTs), and finally the "bind Janus particle" step may be accomplished via techniques described below with respect to the synthetic procedure 700 illustrated in FIG. 7 using the processed f-CNTs to produce a MBARCs-containing product (e.g., a fiber containing MBARCs).

Figure 6:
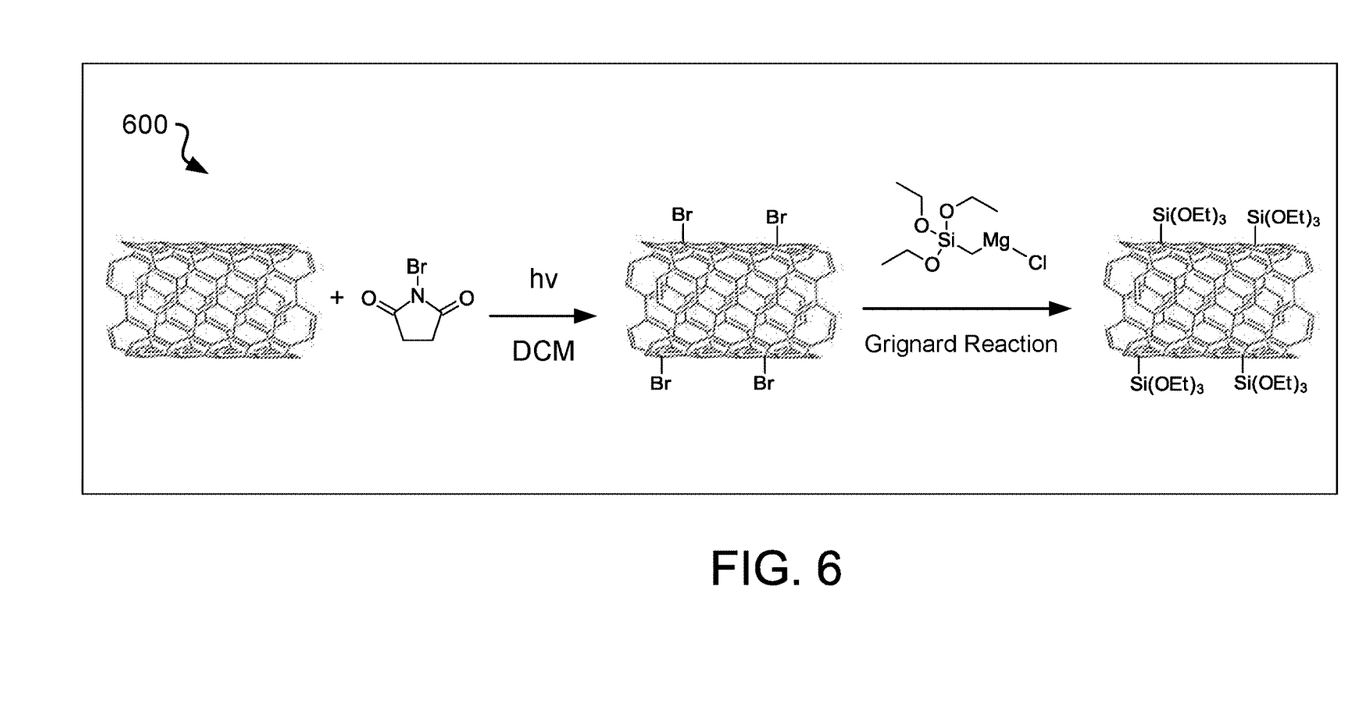
FIG. 6 is a block diagram illustrating a synthetic procedure for functionalizing CNTs, according to some embodiments.

FIG. 6 is a block diagram illustrating a synthetic procedure 600 for functionalizing CNTs, according to some embodiments. The synthetic procedure 600 utilizes a two-step reaction scheme. In the first step of the reaction scheme illustrated in FIG. 6, the surface of a CNT is brominated via a photobromination process. Preferably, the CNT is a high aspect ratio CNT (e.g., length:diameter=800:1). The CNT may, for example, be a high aspect ratio CNT having a length in the range of hundreds of microns to one or more millimeters. In the second step of the reaction scheme illustrated in FIG. 6, the brominated CNT is modified with a silane through a Grignard reaction. One skilled in the art will appreciate that other surface modifications may be deployed with consideration to the particular matrix-bonding functionality of the silica Janus particle that will be used to bond into the matrix polymer. It should be well understood that the matrix-bonding functionality of the silica Janus particle can play no part in the coupling reaction between the CNT and the silica Janus particle.

One skilled in the art will appreciate that other carbon nanomaterials may be used in lieu of, or in addition to, the single-walled carbon nanotube (SWNT) illustrated in FIG. 6. For example, a multi-walled carbon nanotube (MWNT), a carbon nanofiber (CNF), and the like may be used in lieu of, or in addition to, the SWNT illustrated in FIG. 6. Also, one skilled in the art will appreciate that in lieu of producing a brominated CNT in the first step of the reaction scheme illustrated in FIG. 6, a fluorinated CNT may be produced by, for example, chemical fluorination at temperatures between 250 and 400° C. The covalently bonded fluorine may be subsequently replaced by alkyl groups through an alkylation reaction. Either an alkyllithium or Grignard reagent may be used in the alkylation reaction as an alkylation reagent.

Prophetic Example of Functionalized CNT Synthesis

In the first step of the reaction scheme illustrated in FIG. 6, the surface of a CNT is brominated via a photobromination process. A SWNT suspension is prepared by sonication of SWNTs (27 mg) in dichloromethane (20 mL) for 20 min. The SWNT suspension is then poured into a round bottom flask. To this SWNT suspension is added N-bromosuccinimide (CAS Number 128-08-5) (15 mg). The dispersion that results is dark-orange in color. A conventional incandescent light bulb (100 W) is positioned approximately 4-6 mm below the bottom of the flask to irradiate the dispersion while the dispersion is refluxed. The photonic radiation emitted by the light bulb through the flask promotes the formation of free bromine radicals in the dispersion. After allowing the reaction to proceed for about 15 min, more N-bromosuccinimide (28 mg) is added. The additional N-bromosuccinimide further drives the reaction. The reaction is allowed to proceed for another 90 min. The dispersion that results is bright yellow in color. To reduce the rate of reaction, the light bulb is then lowered to approximately 38-42 mm below bottom of the flask. After allowing the reaction to proceed at the reduced rate for another 24 h, the dispersion is cooled. Once cooled, the dispersion may then be filtered through a PTFE membrane (0.45 µm, 25 mm). The precipitate that results may then be washed consecutively with chloroform and diethyl ether. The resulting product (brominated SWNTs) may then be dried in vacuo overnight at 60° C.

In the second step of the reaction scheme illustrated in FIG. 6, the brominated CNT is modified with a silane through a Grignard reaction. A suspension of brominated SWNTs is prepared by sonication of the brominated SWNTs (prepared in the first step of the reaction scheme illustrated in FIG. 6) in dry tetrahydrofuran (20 mL) for 20 min. Added dropwise to the suspension of brominated SWNTs is [(Triethoxysilyl)methyl]magnesium chloride (CAS Number 148599-37-5) as the Grignard Reagent, and the mixture is stirred under nitrogen for 5 h. As illustrated in FIG. 6, [(Triethoxysilyl)methyl]magnesium chloride will react (as the Grignard Reagent) with the brominated (or fluorinated) SWNTs to form silylated SWNTs. Excess Grignard Reagent is then quenched with a saturated aqueous solution of ammonium chloride. The material that results is then washed thoroughly with water. Removal of any residual magnesium salts may be accomplished by re-suspending the material in aqueous 5% HCl solution, followed by washing the material consecutively with water, ethanol and dichloromethane. The resulting product (silylated SWNTs) may then be dried in vacuo overnight at 60° C. \*\*\*End prophetic example of functionalized CNT synthesis.\*\*\*

Figure 7:
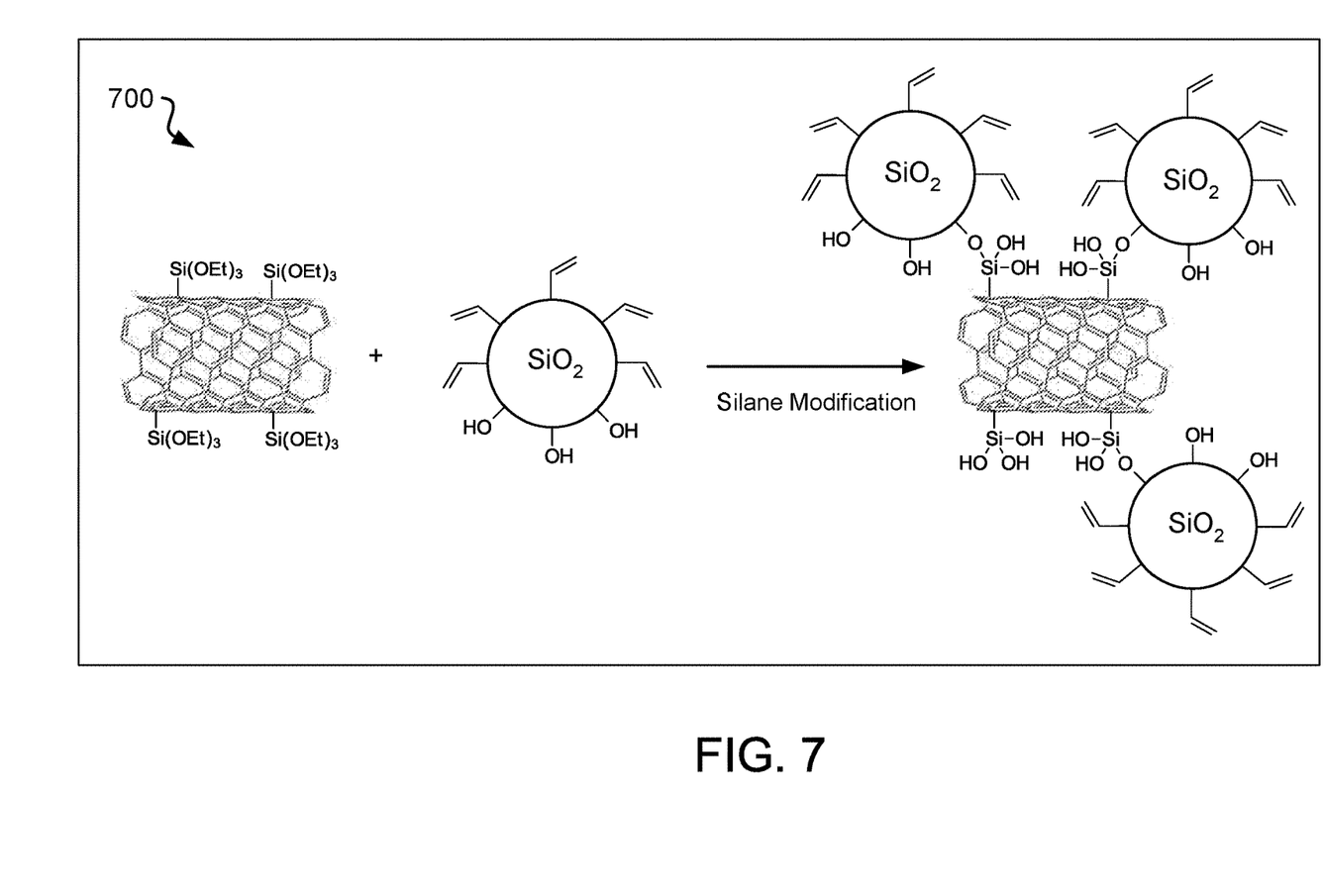
FIG. 7 is a block diagram illustrating a synthetic procedure for preparing matrix-bonding abrasion resistant CNTs (MBARCs) by reacting Janus particles and functionalized CNTs, according to some embodiments.

FIG. 7 is a block diagram illustrating a synthetic procedure 700 for preparing matrix-bonding abrasion resistant CNTs (MBARCs) by reacting Janus particles and functionalized CNTs, according to some embodiments. Janus particles illustrated in FIG. 7 may correspond to the silica Janus particles 440 illustrated in FIG. 5. The functionalized CNT illustrated in FIG. 7 may correspond to the silylated SWNT illustrated in FIG. 6.

The Janus particles and the functionalized CNT are reacted through a condensation reaction that covalently binds the Janus particles to the CNT using the CNT-bonding functionality (hydroxyl groups in the example illustrated in FIG. 7) on the surface of the Janus particles, while leaving the matrix-bonding functionality (vinyl groups in the example illustrated in FIG. 7) on the surface of the Janus particles available for bonding into a polymeric matrix. The alkoxy groups on the functionalized CNTs hydrolyze to silanols, through the addition of water. Subsequently, the silanols react with the CNT-bonding functionality on the Janus particles via the condensation reaction to form a siloxane bond (Si—O—Si) and eliminate water. Only a few of these reactive groups are shown in FIG. 7, along with only a few of the Janus particles, so as not to unnecessarily complicate the drawing.

Prophetic Example of Preparation of MBARCs

A solution containing a dispersion of silica Janus particles (prepared via the synthetic procedures illustrated in FIGS. 2-5) and deionized water is combined with silylated SWNTs (prepared via the synthetic procedure illustrated in FIG. 6). The mixture is sonicated for 15 min and stirred for 12 h. The deionized water causes the alkoxy groups on the silylated SWNTs to hydrolyze to silanols. Subsequently, the silanols react with hydroxyl groups (CNT-bonding functionality) on the unmodified face of the silica Janus particles via a condensation reaction to form a siloxane bond (Si—O—Si) and eliminate water. Hence the silica Janus particles are covalently bonded to the silylated SWNTs. The vinyl groups (matrix-bonding functionality) on the modified face of the silica Janus particle are available for bonding into a polymeric matrix. Removal of any residual Janus particles is accomplished by rinsing the material consecutively with benzene and distilled water. The resulting product (MBARCs) may then be filtered and dried in vacuo overnight at 60° C. *End prophetic example of preparation of MBARCs.*

Figure 8:
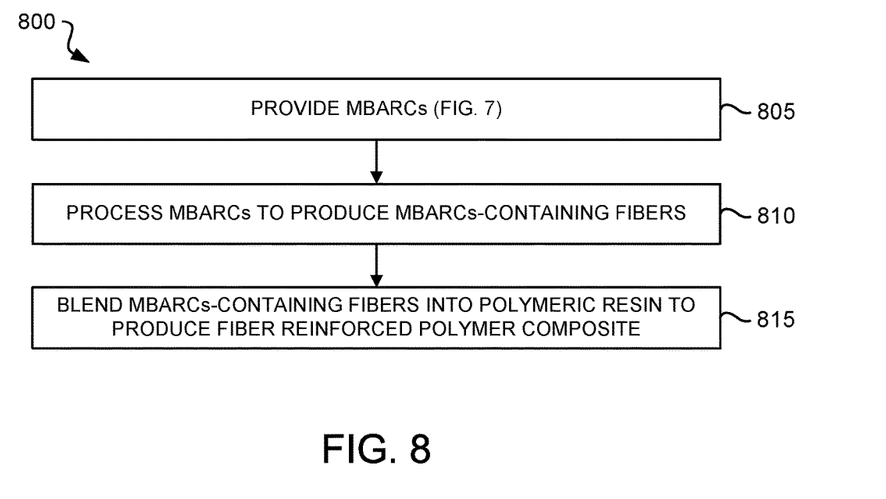
FIG. 8 is a flow diagram illustrating a process of preparing a fiber reinforced polymer composite, according to some embodiments.

FIG. 8 is a flow diagram illustrating a process 800 of preparing a fiber reinforced polymer composite, according to some embodiments. In the process 800, the steps discussed below (steps 805-815) are performed. These steps are set forth in their preferred order. It must be understood, however, that the various steps may occur simultaneously or at other times relative to one another. Moreover, those skilled in the art will appreciate that one or more steps may be omitted.

The process 800 begins by providing matrix-bonding abrasion resistant carbon nanotubes (MBARCs) (step 805). For example, MBARCs may be prepared using the synthetic procedure 700 illustrated in FIG. 7.

After the MBARCs are provided, the process 800 continues by processing the MBARCs (step 810). For example, the MBARCs may be processed to form fibers (or nonwoven fabrics, as described below) using known techniques in the art to braid, twist, etc. the MBARCs. The resulting MBARCs-containing fibers may be the final product, may be further processed (e.g., the MBARCs-containing fibers may be further processed to form MBARCs-containing cloth (e.g., 902 in FIG. 9) using known techniques in the art to weave the MBARCs-containing fibers), or may be blended into polymeric resin to produce a fiber reinforced polymer composite (e.g., as exemplified in step 815, described below).

The MBARCs-containing fibers may then be blended into polymeric resin to produce a fiber reinforced polymer composite (FRPC), wherein the MBARCs of the MBARCs-containing fibers can covalently bind into the polymer matrix (step 815). The newly formed fiber reinforced polymer composite has improved stiffness and abrasion resistance by virtue of the MBARCs of the MBARC-containing fibers. The use of silica Janus particles in the construction of the MBARCs, in accordance with some embodiments of the present invention, simultaneously allows silica particles to be bound to CNTs (via the CNT-bonding functionality of the silica Janus particles) to impart abrasion resistance, while also allowing for binding into a resin (via the matrix-bonding functionality of the silica Janus particles) to improve modulus and stiffness.

Preferably, the MBARCs of the MBARCs-containing fibers are tailored to the polymeric resin. That is, the MBARCs-containing fibers preferably contain MBARCs tailored for blending and bonding into the polymer matrix produced by the polymeric resin. For example, MBARCs having vinyl functionalities (or allyl functionalities) as the matrix-bonding functionality are tailored for blending and bonding into polymer matrices produced from polyamide-based resins, polyester-based resins, polyolefin-based resins, polysulfide-based resins, silicone-based resins, styrene-butadiene-based resins, and vinyl (PVC)-based resins. Depending on the desired polymeric resin, the matrix-bonding functionality of the MBARCs may be, for example, selected from a group consisting of vinyl functionalities, amine functionalities, epoxy functionalities, allyl functionalities, acrylate functionalities, sulfur functionalities, isocyanate functionalities, halogen functionalities, and combinations thereof.

In lieu of forming MBARCs-containing fibers in step 810, the MBARCs may be processed to form nonwoven MBARCs-containing fabrics using known techniques in the art. Both wet and dry CNT fabric formation processes known in the art may be used to process the MBARCs to form nonwoven MBARCs-containing fabrics.

Figure 9:
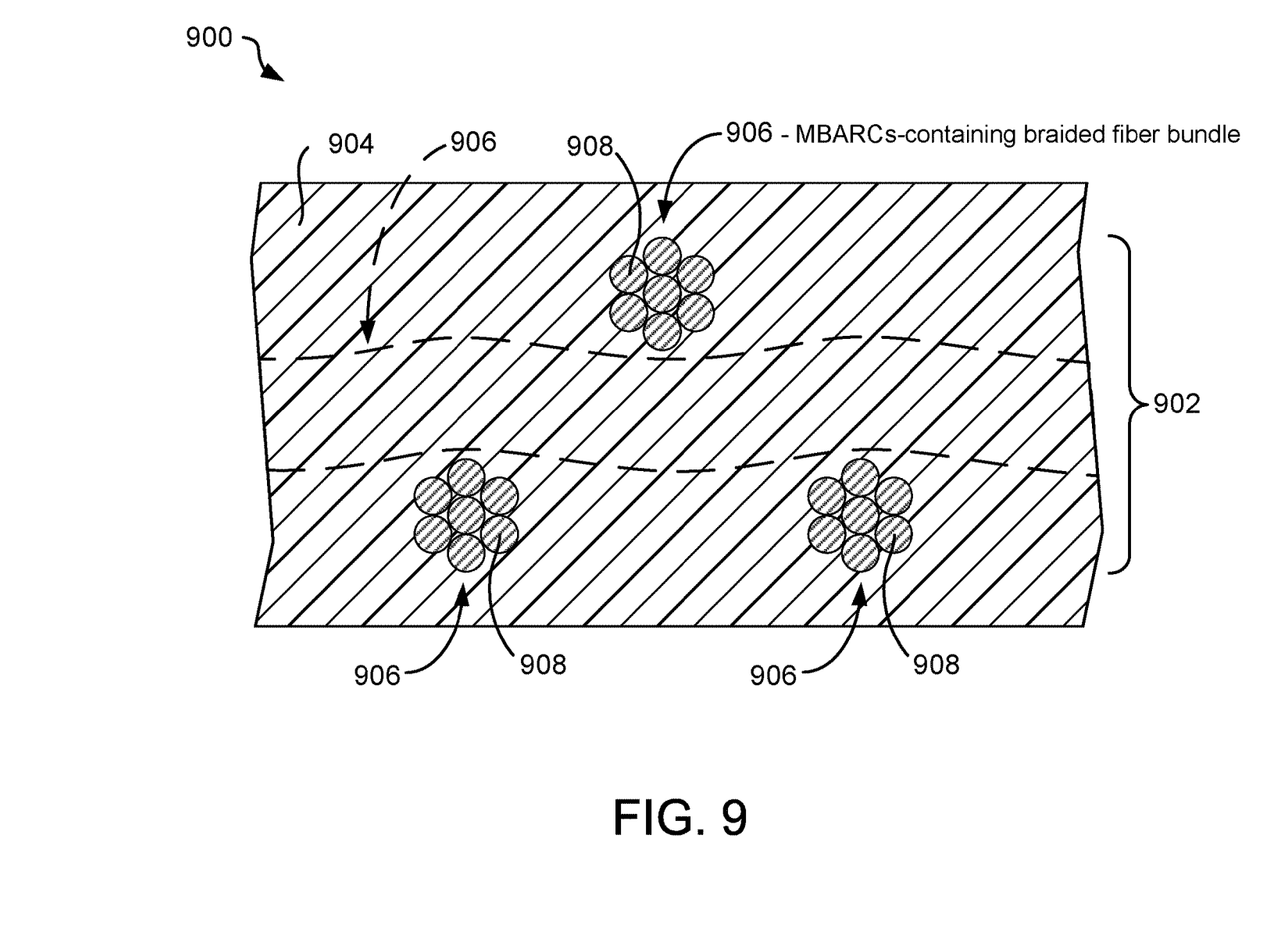
FIG. 9 is a partial, sectional view of a fiber reinforced polymer composite, according to some embodiments.

FIG. 9 is a partial, cross-sectional view of a fiber reinforced polymer composite 900, according to some embodiments. In the embodiment shown in FIG. 9, fiber reinforced polymer composite 900 includes a MBARCs-containing cloth 902 impregnated with a polymeric resin 904. Preferably, the MBARCs of the MBARCs-containing cloth 902 are tailored to the polymeric resin 904. The polymeric resin 904 may be impregnated into the MBARCs-containing cloth 902 using techniques well known to those skilled in the art.

The MBARCs-containing cloth 902 may be constructed of a number of MBARCs-containing fiber bundles 906 (or individual MBARCs-containing fibers) that are woven together in an orthogonal fashion. The MBARCs-containing fiber bundles 906 may be woven to form the MBARCs-containing cloth 902 using techniques well known to those skilled in the art. From the perspective illustrated in FIG. 9, the MBARCs-containing fiber bundles 906 extend within the MBARCs-containing cloth 902 in a transverse direction (these MBARCs-containing fiber bundles extend between left and right, one such MBARCs-containing fiber bundle 906 is denoted with hidden-lines in FIG. 9) and a normal direction (these MBARCs-containing fiber bundles extend into the page, three such MBARCs-containing fiber bundles 906 are shown in FIG. 9).

Each MBARCs-containing fiber bundle 906 includes two or more individual MBARCs-containing fibers 908 that are typically braided or twisted around one another (e.g., in the example shown in FIG. 9, each MBARCs-containing fiber bundle 906 consists of seven individual MBARCs-containing fibers 908—six outer MBARCs-containing fibers braided or twisted around a single central MBARCs-containing fiber). The MBARCs-containing fibers 908 may be braided or twisted to form the MBARCs-containing fiber bundles 906 using techniques well known to those skilled in the art.

Those skilled in the art will appreciate that many variations are possible within the scope of the present invention. Thus, while the present invention has been particularly shown and described with reference to some embodiments thereof, it will be understood by those skilled in the art that these and other changes in form and detail may be made therein without departing from the spirit and scope of the present invention.

What is claimed is:

1. A method, comprising:
providing a plurality of carbon nanotubes (CNTs);
functionalizing the plurality of CNTs to provide a plurality of functionalized CNTs;

providing a plurality of Janus particles, wherein each of the plurality of Janus particles is a silica particle having a surface with a first portion containing a CNT-bonding functionality and a second portion containing a matrix-bonding functionality;

reacting the plurality of functionalized CNTs and the plurality of Janus particles to produce a plurality of matrix-bonding abrasion resistant CNTs (MBARCs).

2. The method as recited in claim 1, further comprising: processing the plurality of MBARCs to produce at least one fiber.

3. The method as recited in claim 2, further comprising: blending the at least one fiber into a polymeric resin to produce a fiber reinforced polymer composite, wherein the matrix-bonding functionality is tailored for blending and bonding into a polymer matrix produced by the polymeric resin.

4. The method as recited in claim 1, wherein the silica particle is a silica nanoparticle.

5. The method as recited in claim 1, wherein the CNT-bonding functionality includes one or more hydroxyl groups.

6. The method as recited in claim 5, wherein the matrix-bonding functionality is selected from a group consisting of vinyl functionalities, amine functionalities, epoxy functionalities, allyl functionalities, acrylate functionalities, sulfur functionalities, isocyanate functionalities, halogen functionalities, and combinations thereof.

7. The method as recited in claim 1, wherein the matrix-bonding functionality is selected from a group consisting of vinyl functionalities, amine functionalities, epoxy functionalities, allyl functionalities, acrylate functionalities, sulfur functionalities, isocyanate functionalities, halogen functionalities, and combinations thereof.

8. The method as recited in claim 1, wherein the CNT-bonding functionality includes residual hydroxyl groups that remain on the first portion of the surface of the silica particle after surface modification of the second portion of the surface of the silica particle to include the matrix-bonding functionality.

9. The method as recited in claim 8, wherein the matrix-bonding functionality is selected from a group consisting of vinyl functionalities, amine functionalities, epoxy functionalities, allyl functionalities, acrylate functionalities, sulfur functionalities, isocyanate functionalities, halogen functionalities, and combinations thereof.

10. A matrix-bonding abrasion resistant carbon nanotube (MBARC), comprising:
a carbon nanotube (CNT) having one or more silica particles covalently bonded to a surface thereof, wherein each of the one or more silica particles has a surface with a portion containing a matrix-bonding functionality.

11. The matrix-bonding abrasion resistant carbon nanotube (MBARC) as recited in claim 10, wherein the silica particle is a silica nanoparticle.

12. The matrix-bonding abrasion resistant carbon nanotube (MBARC) as recited in claim 11, wherein the matrix-bonding functionality is selected from a group consisting of vinyl functionalities, amine functionalities, epoxy functionalities, allyl functionalities, acrylate functionalities, sulfur functionalities, isocyanate functionalities, halogen functionalities, and combinations thereof.

13. The matrix-bonding abrasion resistant carbon nanotube (MBARC) as recited in claim 11, wherein the matrix-bonding functionality is one or more vinyl functionalities.

14. The matrix-bonding abrasion resistant carbon nanotube (MBARC) as recited in claim 10, wherein the MBARC is produced by a method, comprising:
providing a carbon nanotube (CNT);
functionalizing the CNT to provide a functionalized CNT;
providing a plurality of Janus particles, wherein each of the plurality of Janus particles is a silica particle having a surface with a first portion containing a CNT-bonding functionality and a second portion containing the matrix-bonding functionality;
reacting the functionalized CNT and the plurality of Janus particles to produce the MBARC.

15. A fiber reinforced polymer composite, comprising:
a polymeric resin;
a plurality of fibers blended into the polymeric resin, wherein each of the plurality of fibers comprises matrix-bonding abrasion resistant carbon nanotubes (MBARCs), wherein each of the MBARCs comprises a carbon nanotube (CNT) having one or more silica particles covalently bonded to a surface thereof, wherein each of the one or more silica particles is covalently bonded to a polymer matrix formed by the polymeric resin.

16. The fiber reinforced polymer composite as recited in claim 15, wherein the silica particle is a silica nanoparticle.

17. The fiber reinforced polymer composite as recited in claim 15, wherein each of the MBARCs is produced by a method, comprising:
providing a plurality of carbon nanotubes (CNTs);
functionalizing the plurality of CNTs to provide a plurality of functionalized CNTs;
providing a plurality of Janus particles, wherein each of the plurality of Janus particles is a silica particle having a surface with a first portion containing a CNT-bonding functionality and a second portion containing a matrix-bonding functionality;
reacting the plurality of functionalized CNTs and the plurality of Janus particles to produce a plurality of the MBARCs.

* * * * *